US011752941B2

(12) United States Patent
Roth

(10) Patent No.: US 11,752,941 B2
(45) Date of Patent: Sep. 12, 2023

(54) MIRROR CLEANING SYSTEM

(71) Applicant: Robert Roth, Mesa, AZ (US)

(72) Inventor: Robert Roth, Mesa, AZ (US)

( * ) Notice: Subject to any disclaimer, the term of this patent is extended or adjusted under 35 U.S.C. 154(b) by 458 days.

(21) Appl. No.: 16/786,378

(22) Filed: Feb. 10, 2020

(65) Prior Publication Data

US 2020/0290568 A1    Sep. 17, 2020

Related U.S. Application Data

(60) Provisional application No. 62/817,645, filed on Mar. 13, 2019.

(51) Int. Cl.
| *B60R 1/06* | (2006.01) |
| *B60S 1/04* | (2006.01) |
| *B60S 1/50* | (2006.01) |
| *B60R 1/00* | (2022.01) |
| *B60S 1/38* | (2006.01) |
| *B60S 1/02* | (2006.01) |
| *B60S 1/34* | (2006.01) |
| *B60S 1/56* | (2006.01) |
| *B60S 1/52* | (2006.01) |
| *B60S 1/08* | (2006.01) |

(52) U.S. Cl.
CPC ........... *B60R 1/0602* (2013.01); *B60R 1/006* (2013.01); *B60S 1/023* (2013.01); *B60S 1/043* (2013.01); *B60S 1/3404* (2013.01); *B60S 1/38* (2013.01); *B60S 1/50* (2013.01); *B60S 1/566* (2013.01); *B60S 1/08* (2013.01); *B60S 1/52* (2013.01)

(58) Field of Classification Search
CPC .. B60S 1/023; B60S 1/043; B60S 1/52; B60S 1/56; B60S 1/566; B60S 1/60; B60S 1/3404; B60R 1/0602; B60R 1/006

USPC ....................................... 15/250.003, 250.002
See application file for complete search history.

(56) References Cited

U.S. PATENT DOCUMENTS

| 2,913,754 | A | * | 11/1959 | Vander Zee | .......... B60R 1/0602 |
| | | | | | 359/507 |
| 3,135,004 | A | * | 6/1964 | Naigraw | ................ B60R 1/0602 |
| | | | | | 15/250.002 |
| 3,526,920 | A | * | 9/1970 | Boyanich, Sr. | ........ B60R 1/0602 |
| | | | | | 15/250.003 |
| 4,037,286 | A | * | 7/1977 | Medearis | .............. B60R 1/0602 |
| | | | | | 15/250.05 |
| 5,150,497 | A | | 9/1992 | Preik | |

(Continued)

FOREIGN PATENT DOCUMENTS

KR        10-0883383        *  2/2009

OTHER PUBLICATIONS

Machine translation of description portion of Korean publication 10-0883383, published Feb. 2009. (Year: 2009).*

*Primary Examiner* — Gary K. Graham
(74) *Attorney, Agent, or Firm* — Boudwin Intellectual Property; Daniel Boudwin

(57) ABSTRACT

A mirror cleaning system, an improved mirror for a vehicle having the system installed thereto, and a method of cleaning the improved mirror using the system. The system includes a housing attachable to a vehicle side mirror, a heating element operably connected to a power source, a wiper, and a spray nozzle fluidly connected to a cleaning fluid source. The system is designed to de-ice and de-frost the improved mirror, spray cleaning fluid thereon, and wipe debris and fluids to improve driver visibility.

11 Claims, 5 Drawing Sheets

(56) References Cited

U.S. PATENT DOCUMENTS

| | | | |
|---|---|---|---|
| 5,592,715 A | 1/1997 | Yoshida et al. | |
| 5,634,234 A | 6/1997 | Allain | |
| 5,868,867 A | 2/1999 | Clukey | |
| 6,289,549 B1 * | 9/2001 | Rudningen | B60S 1/52 359/507 |
| 7,856,693 B1 * | 12/2010 | Johnson | B60S 1/48 359/872 |
| 8,327,495 B1 | 12/2012 | Martinez | |
| 2001/0049853 A1 * | 12/2001 | Johnson | B60S 1/0497 15/250.003 |
| 2002/0100136 A1 * | 8/2002 | Waters | B60R 1/0602 15/250.003 |

* cited by examiner

MIRROR CLEANING SYSTEM

CROSS REFERENCE TO RELATED APPLICATIONS

This application claims priority under 35 U.S.C. § 119(e) to U.S. Provisional Application No. 62/817,645 filed on Mar. 13, 2019. The above identified patent application is incorporated by reference herein in its entirety to provide continuity of disclosure.

BACKGROUND OF THE INVENTION

The present invention relates to a mirror cleaning system for cleaning a mirror, such as a side mirror of a vehicle with the system installed thereto.

Many drivers, including professional drivers or drivers who operate commercial vehicles such as trucks or transit vehicles, school buses, semi-trucks, and the like, often need to stop driving in order to clean side mirrors to remove debris, such as snow, ice, or dirt. This is necessary to enable the driver to see nearby traffic, including other vehicles and pedestrians, and more safely navigate the road. However, in many situations, the driver may be unable to pull over and stop driving to clean the side mirrors, such as when navigating multi-lane traffic, busy traffic, or where there is no shoulder or other place to stop. Accordingly, in at least these scenarios, the driver must wait to clean the side mirrors, and a risk of an accident is increased during the period in which the side mirrors are dirty.

Therefore, there is a need for a mirror cleaning system for a vehicle side mirror, and an improved vehicle side mirror with the system installed thereto, that enables the driver, operator, or passenger to effectively dean the vehicle side mirror without needing to stop the vehicle. The present invention addresses this unmet need.

Devices have been disclosed in the art that relate to vehicle side mirror cleaning. These include devices that have been patented and published in patent application publications. These devices are often unsatisfactory, and do not include a plurality of features for cleaning a vehicle side mirror, during transit of the vehicle, and regardless of weather conditions. In view of the devices disclosed in the art, it is submitted that there is a need in the art for an improvement to existing vehicle side mirror cleaning systems. In view of the present disclosure, it is submitted that the present invention substantially diverges in structural and functional elements from devices in the art, and fulfills an unmet need in the art.

SUMMARY OF THE INVENTION

In view of the disadvantages inherent in the known types of vehicle side mirror cleaning systems in the art, the present invention provides a new and improved vehicle side mirror cleaning system, wherein the same can be utilized for cleaning a side mirror of a vehicle.

It is therefore an object of the present invention to provide a mirror cleaning system for cleaning a side mirror of a vehicle with the system installed thereto.

In one aspect, the invention provides a mirror cleaning system for cleaning a side mirror of a vehicle, comprising a housing with an upper annular lip that extends therefrom, wherein the housing is securable to a vehicle side mirror. The system comprises a mirror securable to the upper annular lip to form a first interior volume of the housing, and a spray nozzle attachable to the housing, such that the spray nozzle is configured to spray the mirror, and a wiper blade securable to the housing, such that the wiper blade is configured to wipe the mirror. In such embodiments, the system may be fitted to the vehicle side mirror either during or after manufacture of the vehicle. The housing clips to the vehicle side mirror, such that the mirror of the system may be viewed by a driver instead of an original vehicle side mirror of the vehicle.

In some embodiments, the system comprises a transparent window instead of the mirror of the system; in such embodiments, the original vehicle side mirror is viewed by the driver through the transparent window, which covers and protects the original vehicle side mirror from exposure to the environment. In such embodiments, the spray nozzle is configured to spray the transparent window, any heating element included is configured to de-ice or de-frost the transparent window and/or the original vehicle side mirror, and the wiper blade is configured to wipe the transparent window.

In other embodiments, the mirror and the transparent window are omitted from the system of the invention, and the original vehicle side mirror is directly viewed by the driver and directly sprayed by the spray nozzle, wiped by the wiper blade, and/or heated by any heating element of the system. In such embodiments, the housing attaches directly to the original vehicle side mirror and the system is thereby configured to clean the original vehicle side view mirror.

In another aspect, the invention provides a mirror cleaning system for cleaning the side mirror of the vehicle with the system installed thereto, wherein the system comprises the housing, the spray nozzle fluidly connected to a cleaning fluid source, the wiper blade, and a wiper blade motor operably connected to the power source and configured to actuate the wiper blade to wipe the mirror. In such embodiments, the cleaning fluid source may comprise a cleaning fluid reservoir of the vehicle to which the vehicle side mirror is attached. In some embodiments, the system comprises the transparent window instead of the mirror of the system; in such embodiments, the original vehicle side mirror is viewed by the driver through the transparent window. In other embodiments, the system omits the transparent window and the mirror of the system; in such embodiments, the original vehicle side mirror is both viewed by the driver and cleaned, heated, wiped, and/or maintained by one or more components of the system.

In some embodiments, the cleaning fluid source comprises a cleaning fluid reservoir of a vehicle to which the vehicle side mirror is attached. The cleaning fluid reservoir may be a windshield wiper fluid tank which holds windshield wiper fluid therein for deliver to a windshield of the vehicle. In such embodiments, the cleaning fluid reservoir is fluidly connected to the spray nozzle for delivery, i.e., conditional delivery, of the cleaning fluid to the mirror or transparent window of the system. In this manner, the spray nozzle may not need to rely on a dedicated source of cleaning fluid, which would need to be refilled independent of the cleaning fluid reservoir of the vehicle.

In some embodiments, the power source comprises a battery of the vehicle to which the vehicle side mirror is attached. By connecting one or more electrical components of the system—such as the wiper blade motor and/or the heating element—to the battery and electrical system of the vehicle, these components may not need to rely on a dedicated power source for supply of electricity, which would need to be recharged independent of the battery of the vehicle.

In some embodiments, an operable connection between the spray nozzle and the cleaning fluid source is actuatable by a fluid control of the system. In such embodiments, the fluid control may be operated by an individual in the vehicle, such as the driver, to actuate the operable connection and activate the spray nozzle of the system. In this manner, the spray nozzle may be activated independent of the windshield wipers and/or windshield sprayers to clean the mirror or transparent window of the system when needed.

In some embodiments, an operable connection between the heating element and the power source is actuatable by a heat control of the system. In such embodiments, the heat control may be operated by the individual or driver in the vehicle to actuate the operable connection and supply electricity from the power source to the heating element. In this manner, the heating element may be activated independent of the window defroster of the vehicle to de-ice or defrost the mirror or transparent window of the system when needed.

In some embodiments, an operable connection between the wiper blade motor and the power source is actuatable by a wipe control of the system. In such embodiments, the wipe control may be operated by the individual or driver in the vehicle to actuate the operable connection and supply electricity from the power source to the wiper blade motor. In this manner, the wiper blade motor may be activated to wipe the mirror or transparent window of the system when needed.

In some embodiments, the housing further comprises a first groove thereon, wherein a first connection member of the wiper blade is securable within the first groove. Upon an actuation of the first connection member within the first groove, a blade of the wiper blade wipes the mirror or transparent window. In such embodiments, the wiper blade motor may be configured to actuate the first connection member within and along a length of the first groove, such that the wiper blade wipes the mirror or transparent window according to the length of the first groove.

In some embodiments, the housing further comprises a second groove thereon, wherein a second connection member of the wiper blade is securable within the second groove. Upon an actuation of the second connection member within the second groove, the blade of the wiper blade wipes the mirror or transparent window. In such embodiments, the wiper blade motor may be configured to actuate the second connection member within and along a length of the second groove, such that the wiper blade wipes the mirror or transparent window according to the length of the second groove. In such embodiments, the first connection member and the second connection member may be co-actuated such that a blade of the wiper blade remains perpendicular or nearly perpendicular to the first and second grooves during the actuation movement.

In some embodiments, the housing further comprises a lower annular lip that extends therefrom opposite the upper annular lip to form a second interior volume of the housing, wherein a pair of clips extend from an inner surface of the lower annular lip. In such embodiments the pair of clips may be utilized to secure, e.g., removably secure, the housing of the system to the vehicle side mirror.

In some embodiments, the second interior volume is configured to accept the vehicle side mirror therein such that the pair of clips secure the vehicle side mirror within the second interior volume. The clips may be configured to bend outward, snap back into place, and/or to slidingly accept the vehicle side mirror therein. In this manner, the system remains affixed to the vehicle side mirror for use and does not become detached when traveling on roads and highways, e.g., at high speeds.

Another object of the present invention is to provide a mirror cleaning system that may be readily manufactured from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of the invention will be particularly pointed out in the claims, the invention itself and manners in which it may be made and used may be better understood after a review of the following description, taken in connection with the accompanying drawings, wherein like numeral annotations are provided throughout.

DETAILED DESCRIPTION OF THE INVENTION

Figure 1:
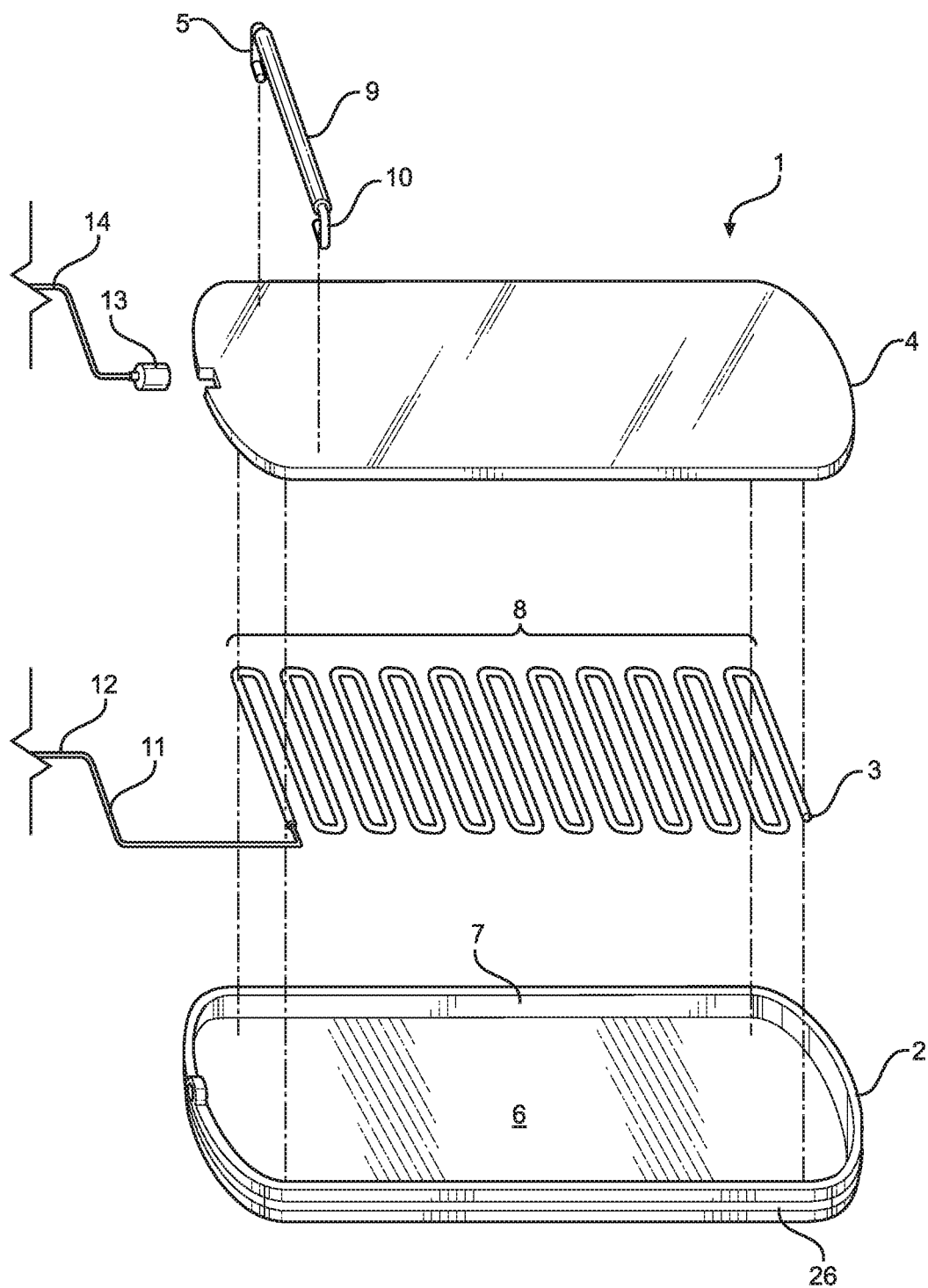
FIG. 1 depicts an upper exploded view of an exemplary mirror cleaning system according to the present invention.

Reference is made herein to the attached drawings. Like reference numerals are used throughout the drawings to depict like or similar elements of the invention. The figures are intended for representative purposes only and should not be considered limiting in any respect.

Figure 2:
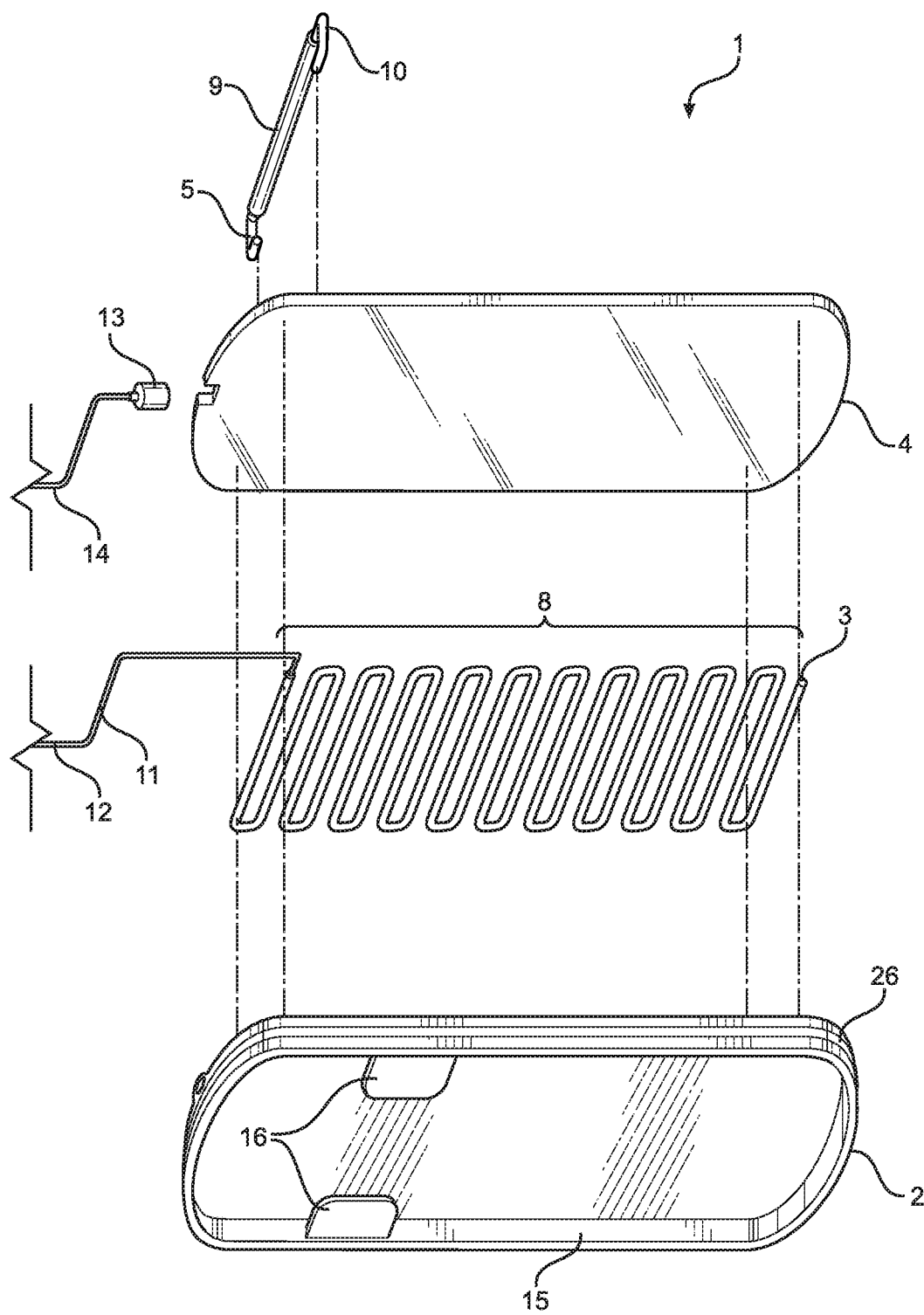
FIG. 2 depicts a lower exploded view of the exemplary mirror cleaning system.

Referring now to FIGS. 1 and 2, there are depicted an upper exploded view (FIG. 1) and a lower exploded view (FIG. 2) of an exemplary mirror cleaning system according to the present invention. A mirror cleaning system 1 comprises a housing 2 with an upper annular lip 7 that extends therefrom. The housing 2 is securable to a vehicle side mirror. In the shown embodiment, the system 1 comprises a mirror 4 securable to the upper annular lip 7 of the housing 2 to form a first interior volume 6 of the housing 2, however, in alternate embodiments, a transparent window may be included instead of the mirror 4; in such embodiments, the transparent window may attach to the housing 2 in the same manner as the mirror 4. In the shown embodiment, a spray nozzle 13 attachable to the housing 2 is included, such that the spray nozzle 13 is configured to spray the mirror 4. The system 1 also includes a wiper blade that comprises a blade 9, a first connection member 10, and a second connection member 5.

Each of the first and second connection members (10, 5) includes a central portion affixed to the blade 9, an arm portion that extends downward at a right angle relative to the blade 9, and a hook portion that extends centrally from the arm portion such that the hook portions are parallel to the blade 9. During assembly of the system 1, the hook portions of the first and second connection members (10, 5) are inserted into a first groove 26 and a second groove of the housing 2, where the hook portions engage, either directly or indirectly, a wiper blade motor, disposed within or adjacent to the housing, which controls a sliding actuation of the hook portions of the first and second connection members (10, 5) along the first groove 26 and the second groove of the housing 2. The first groove 26 extends along a length of an exterior surface of the housing 2, and the second groove extends along a length of the exterior surface of the housing 2, opposite the first groove 26. Upon connection of the hook portions of the first and second connection members (10, 5) into the first groove 26 and second groove, respectively, the wiper blade is configured for actuation by the wiper blade motor to wipe the mirror 4.

In the shown embodiment, the system 1 includes a heating element 3, is comprised of a resistive wire 8 that generates heat when current passes therethrough. In the shown embodiment, the heating element 3 is operably connected to a supply wire 11, which is operably connected to a power source by a lead wire 12. The heating element 3, the supply wire 11, and the lead wire 12 are operably connected to each other and to the power source. In this manner, an operable connection between the power source and the heating element 3 is controllable by an individual, such as a driver or operator of the vehicle to which the system 1 is installed, for delivery of electrical current to the heating element 3 to cause it to increase a temperature thereof for de-icing and/or defrosting one or more components of the system 1 and/or the vehicle, e.g., the original vehicle mirror, according to certain embodiments.

The spray nozzle 13 is fluidly and/or operably connected to a cleaning fluid source, such as a cleaning fluid reservoir of the vehicle, by connection 14. Connection 14 delivers fluid (e.g., a cleaning liquid or windshield wiper fluid) to the spray nozzle 13, which in turn sprays the fluid onto the mirror 4. The fluid may be conditionally delivered through the spray nozzle 13, such as by actuation of an operable connection between the fluid source and the spray nozzle 13. In this manner, the fluid is conditionally delivered to the mirror 4 to clean the mirror 4.

In the embodiment depicted in FIG. 2, the housing 2 further comprises a lower annular lip 15 that extends from the housing 2 opposite the upper annular lip (7 of FIG. 1) to form a second interior volume of the housing 2. A pair of clips 16 extend from an inner surface of the lower annular lip 15. In this manner, the pair of clips 16 may be utilized to secure, e.g., removably secure, the housing 2 of the system 1 to the vehicle side mirror. The second interior volume is sized and/or configured to accept the vehicle side mirror therein, such that the pair of clips 16 secure the vehicle side mirror within the second interior volume. In this manner, the housing 2 does not detach from the vehicle side mirror during use or operation of the system and/or the vehicle.

In the shown embodiment, the system 1 comprises the mirror 4 as a component of the system 1, and the wiper blade is configured to wipe the mirror 4 during a use of the system 1. However, in alternate embodiments, the system 1 comprises a transparent window instead of, or in place of, the mirror 4 of the system 1; in such embodiments, the original vehicle side mirror is viewed by the driver through the transparent window, which covers and protects the original vehicle side mirror from exposure to the environment. In such embodiments, the spray nozzle 13 is configured to spray the transparent window, and the wiper blade is configured to wipe the transparent window. In addition, in some such embodiments, the heating element 3 is configured to de-ice or defrost the transparent window and/or the original vehicle side mirror. Generally, in such embodiments, the system 1 is configured such that the transparent window provides an unobstructed view of the original vehicle side mirror to the driver. To achieve this, certain elements of the system 1, including but not necessarily limited to the heating element 3 and the housing 2, may be altered, modified, changed, or excluded from the system 1 as needed for a particular application.

In other embodiments, the system 1 comprises neither the mirror 4 nor the transparent window. In such embodiments, the housing 2 is attached directly to the original vehicle side mirror for preparation of the system 1 for use. In this case, after configuration of the system 1 for use, the spray nozzle 13 may spray the original vehicle side mirror directly, and the wiper blade may wipe the original vehicle side mirror directly, in order to clean the original vehicle side mirror and remove debris therefrom. In some such embodiments, the heating element may be configured to de-ice and defrost the original vehicle side mirror. In other such embodiments, the heating element may be omitted from the system for greater simplicity of design and use.

Figure 3:
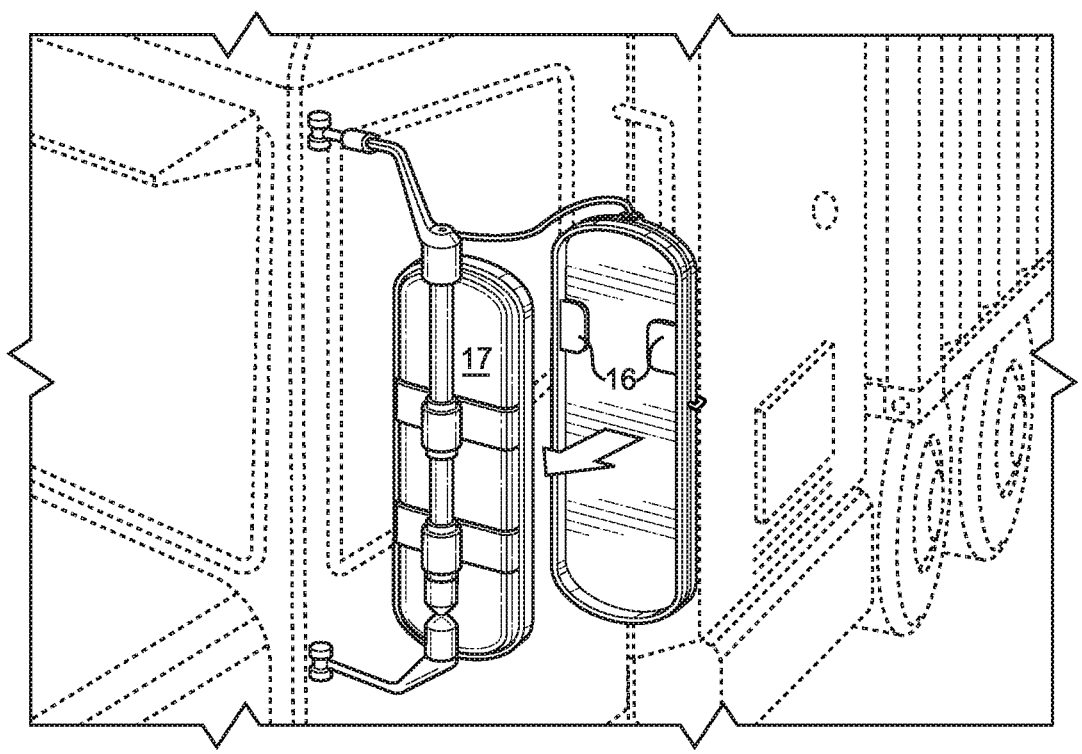
FIG. 3 depicts a front perspective view of the mirror cleaning system, adjacent to a vehicle side mirror of a vehicle.

Referring now to FIG. 3, there is depicted a front perspective view of the mirror cleaning system, adjacent to a vehicle side mirror of a vehicle. The arrow depicts how the system is attached to a vehicle side mirror 17. After attachment of the system to the vehicle side mirror 17, the pair of clips 16 engage forward portions of the vehicle side mirror 17 to secure the system thereto. In this manner, the system may be secured, e.g., reversibly secured, to the vehicle side mirror to prevent displacement, detachment, and/or loss of the system during operation of the vehicle and/or system.

In various embodiments, the system may be sized and configured for use with one or more of "West Coast" style mirrors, "East Coast" style mirrors, or another style or type of mirror. In certain embodiments, the system is sized and/or configured for use with a mirror that is 16.25 inches in length and 6.5 inches in width. In various embodiments, the system may be particularly useful for larger vehicles, such as commercial trucks, for cleaning one or more side mirrors thereof.

Figure 4:
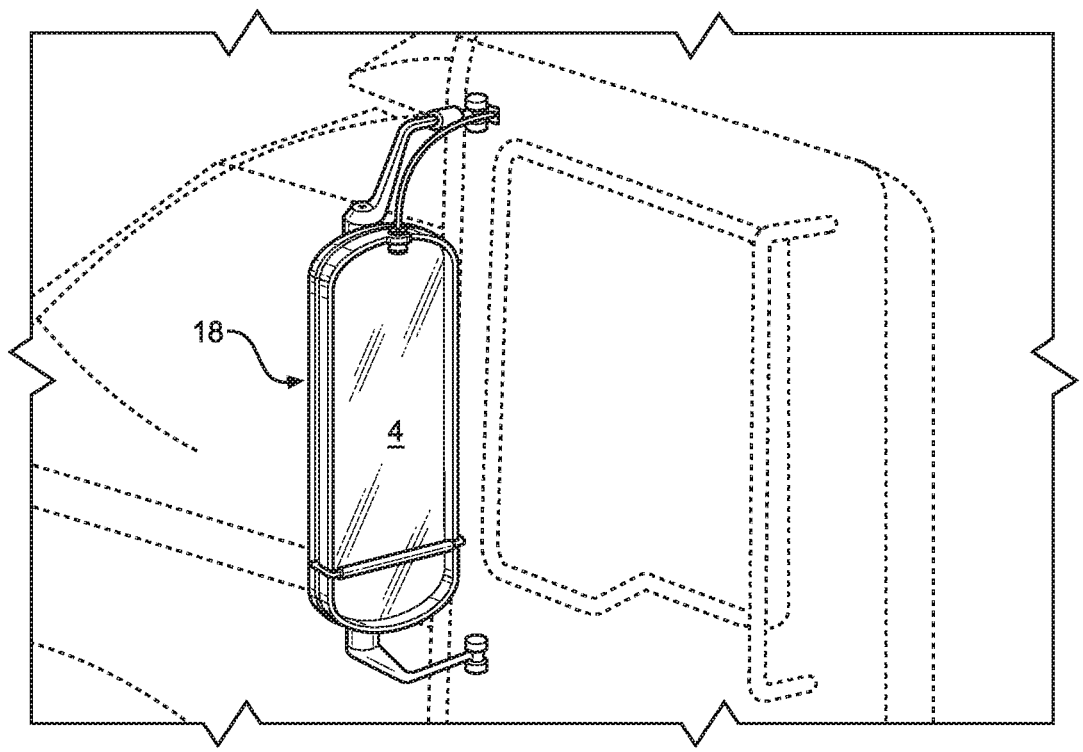
FIG. 4 depicts a rear perspective view of the mirror cleaning system, attached to the vehicle side mirror of the vehicle.

Referring now to FIG. 4, there is depicted a rear perspective view of the mirror cleaning system, attached to the vehicle side mirror of the vehicle. In the shown embodiment, an improved mirror 18, with the system installed thereto, is depicted. In the shown embodiment, the mirror 4 of the system is included, however, in alternate embodiments of the improved mirror 18, the mirror 4 of the system may be omitted or replaced with the transparent window, as would be understood by the person having ordinary skill in the art. In the shown embodiment, the wiper blade is in a lowered position, and the spray nozzle is positioned above the mirror 4, configured for use.

In various embodiments, the spray nozzle may be angled and/or otherwise configured such that the fluid sprayed therefrom effectively contacts the mirror 4, the transparent window, or the original vehicle side mirror, according to a particular embodiment. In this manner, when the vehicle is traveling at high speeds and wind blows over the improved mirror 18, the fluid is not lost or wasted. In like manner, the mirror 4, the transparent window, or the original vehicle side mirror may be effectively cleaned during use of the system.

Figure 5:
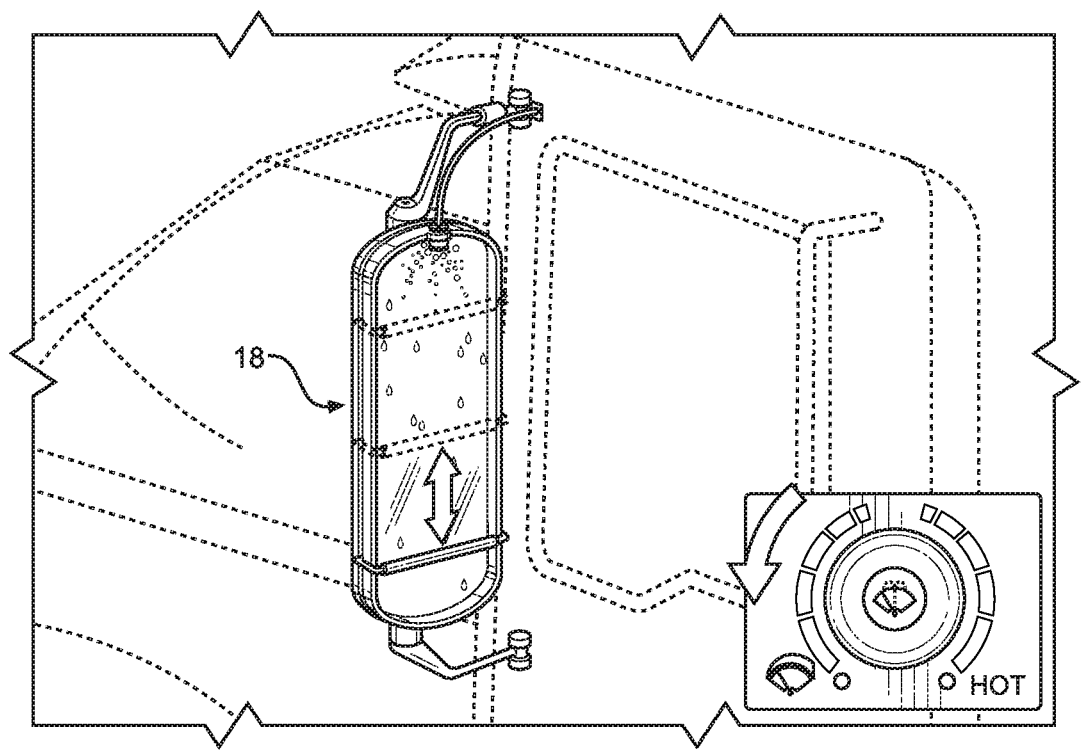
FIG. 5 depicts a rear perspective view of the mirror cleaning system, attached to the vehicle side mirror and in use to spray and wipe a surface of the system.

Referring now to FIG. 5, there is depicted a rear perspective view of the mirror cleaning system, attached to the vehicle side mirror and in use to spray and wipe a surface of the system. The improved mirror 18 is shown during use of both a spray function of the spray nozzle, and a wipe function of the wiper blade. The inset depicts a control that may be positioned inside the vehicle and configured to conditionally operate one or more components of the system and/or the improved mirror 18. In the shown embodiment, the arrow of the inset is depicted as positioned or rotated toward the left (i.e., counterclockwise), and is activating both the spray nozzle and the wiper blade to spray the surface of the system. In the shown embodiment, the surface includes the mirror of the system, but in alternate embodiments, the surface includes the transparent window or the original vehicle side mirror, as described elsewhere herein.

In the shown embodiment, the wiper blade slides along a length of the mirror or transparent window of the system to wipe away liquid and debris. In addition, the wiper blade moves vertically with respect to a vertical axis of the system when installed to form the improved mirror 18. The vertical movement occurs along a height of the improved mirror 18, and the direction of movement is perpendicular to a width of the improved mirror 18. In this manner, the wiping function of the wiper blade cleans the mirror, the transparent window, or the original vehicle side mirror by wiping vertically (i.e., downward, upward, and/or both upward and downward). In this manner, each cycle of movement may include a downward motion followed by an upward motion of the wiper blade. During use, any number of cycles of movement of the wiper blade may be utilized as needed to satisfactorily Mean the mirror, the transparent window, or the original vehicle side mirror.

Figure 6:
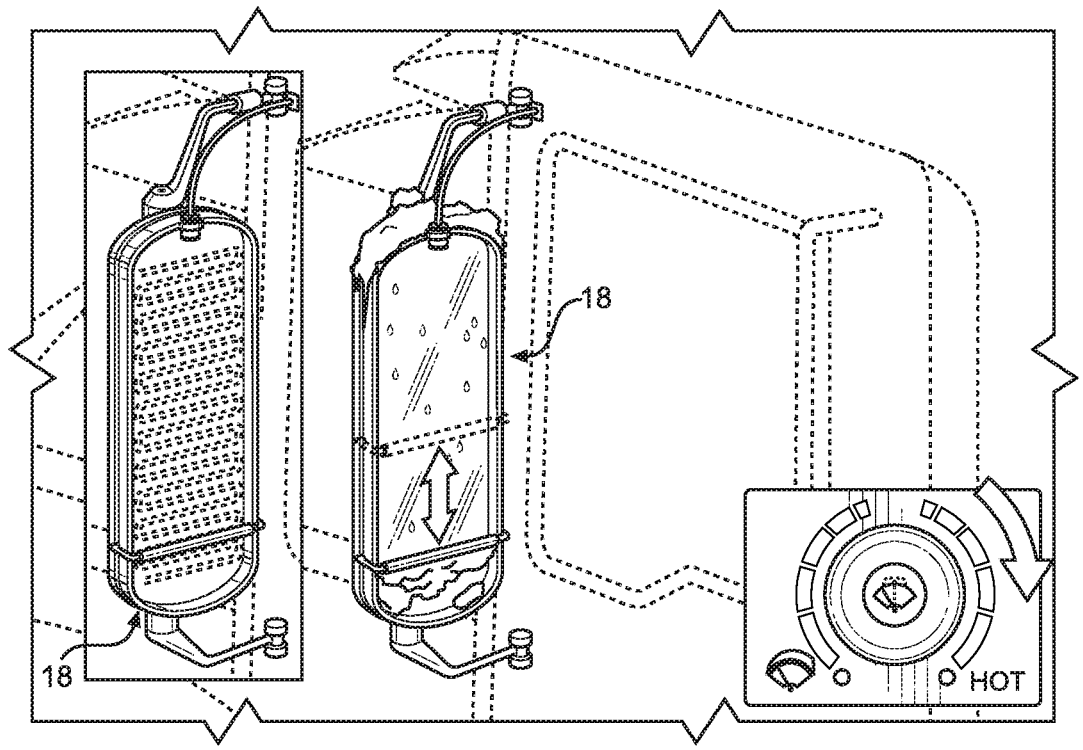
FIG. 6 depicts a rear perspective view of the mirror cleaning system, attached to the vehicle side mirror and in use to heat, defrost, and wipe the surface of the system.

Referring now to FIG. 6, there is depicted a rear perspective view of the mirror cleaning system, attached to the vehicle side mirror and in use to heat, defrost, and wipe the surface of the system. In the shown embodiment, the heating element of the improved mirror 18 is activated (left inset, broken lines depict the heating element), and after the heating element melts, de-ices, or defrosts the surface of the system (i.e., the mirror, the transparent window, or the original vehicle side mirror), the spray nozzle is activated to spray the cleaning fluid onto the surface of the system of the improved mirror 18, and the wiper blade is activated to wipe away the cleaning fluid, any snow, any ice, and any other debris therefrom. In the shown embodiment, the arrow of the right inset is depicted as positioned or rotated toward the right (i.e., clockwise), and is activating the heating element to heat the surface of the system.

Figure 7:
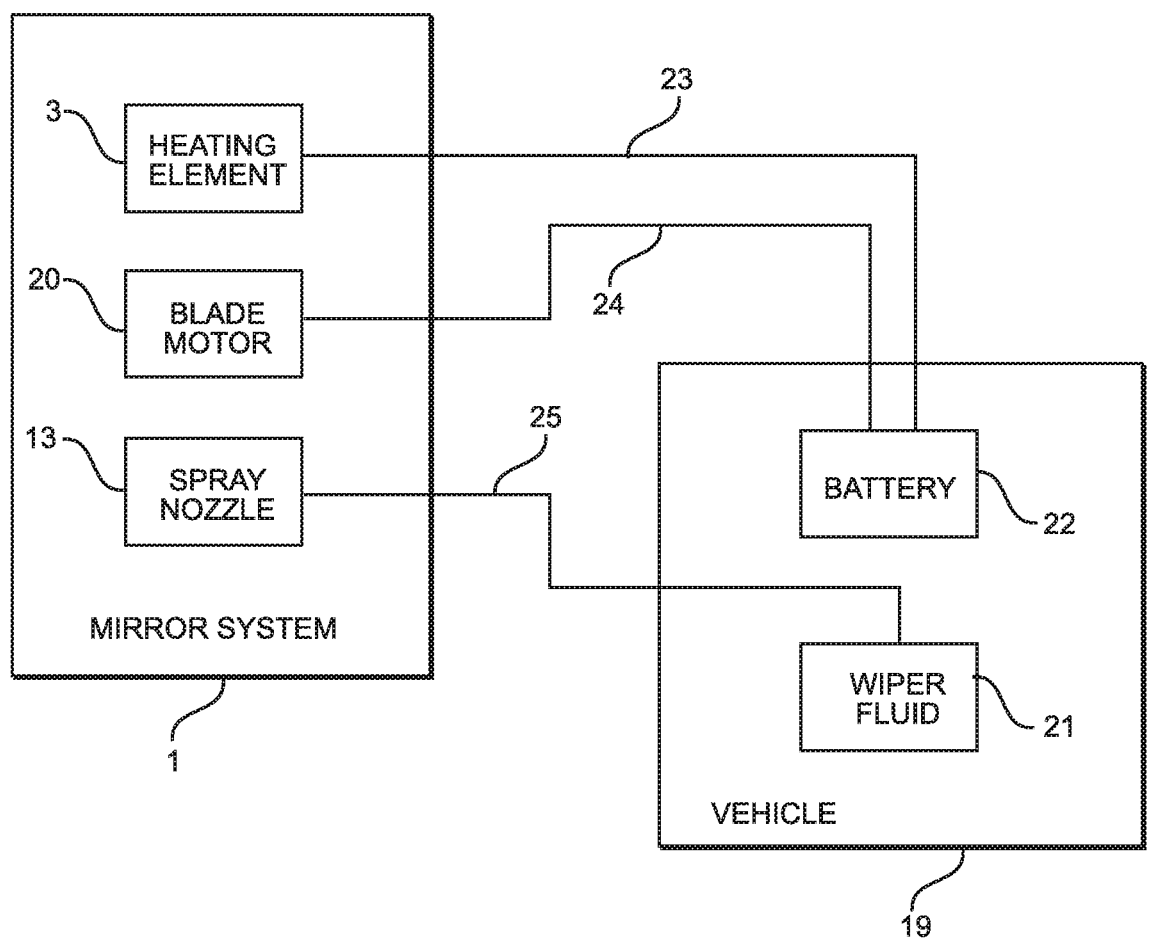
FIG. 7 depicts a schematic diagram of components of the mirror cleaning system as they relate to components of a vehicle to which the system is installed.

Referring now to FIG. 7, there is depicted a schematic diagram of components of the mirror cleaning system as they relate to components of a vehicle to which the system is installed. In the shown embodiment, the system 1 comprises the heating element 3, the wiper blade motor 20, and the spray nozzle 13. The vehicle 19 comprises the battery 2, and the wiper fluid reservoir 21. The heating element 3 and the blade motor 20 are operably connected to the battery 22 of the vehicle 19 by operable connections 23 and 24, respectively. The spray nozzle 13 is operably connected to the wiper fluid reservoir 21 by operable connection 25.

In various embodiments, because the power source that powers the heating element 3 and/or the blade motor 20 includes the battery 22 of the vehicle 19, these components may not need to rely on a dedicated power source for supply of electricity, which would need to be recharged independent of the battery 22 of the vehicle 19.

In various embodiments, the operable connection 25 between the spray nozzle 13 and the wiper fluid reservoir 21 is actuatable by a fluid control of the system 1, e.g., as depicted in FIG. 5 (see inset). In such embodiments, the fluid control may open a valve, activate a pump, or otherwise cause the cleaning fluid of the wiper fluid reservoir 21 to be delivered to and through the spray nozzle 13 for cleaning the surface (i.e., the mirror, the transparent window, or the original vehicle side mirror, according to a particular embodiments). In this manner, the spray nozzle may be activated independent of the windshield wipers and/or windshield sprayers to clean the surface of the system when needed.

In addition, the operable connection 23 between the heating element 3 and the battery 22 is actuatable by a heat control of the system 1, e.g., as depicted in FIG. 6 (see insets). In such embodiments, the heat control may electrically connect the power source (battery 22) to the heating element 3 to cause delivery of current therethrough to heat the heating element 3. In this manner, the heating element may be activated independent of the window defroster of the vehicle to de-ice or defrost the surface of the system when needed.

In the shown embodiment, the operable connection 24 between the wiper blade motor 20 and the battery 22 is actuatable by a wipe control of the system, e.g., as depicted in FIG. 5 (see inset). In such embodiments, the wipe control may electrically connect the power source (battery 22) to the wiper blade motor 20 to cause delivery of current thereto, to activate the wiper blade motor 20. In this manner, the wiper blade motor 20 may be activated to wipe the surface of the system when needed.

The foregoing descriptions of specific embodiments of the present invention have been presented for purposes of illustration and description. They are not intended to be exhaustive or to limit the present invention to the precise forms disclosed, and modifications and variations are possible in view of the above teaching. The exemplary embodiment was chosen and described to best explain the principles of the present invention and its practical application, to thereby enable others skilled in the art to best utilize the present invention and its embodiments with modifications as suited to the use contemplated.

It is therefore submitted that the present invention has been shown and described in the most practical and exemplary embodiments. It should be recognized that departures may be made which fall within the scope of the invention. With respect to the description provided herein, it is submitted that the optimal features of the invention include variations in size, materials, shape, form, function and manner of operation, assembly, and use. All structures, functions, and relationships equivalent or essentially equivalent to those disclosed are intended to be encompassed by the present invention.

I claim:

1. A mirror cleaning system, comprising:
   a housing with an upper annular lip that extends therefrom, wherein the housing is securable to a vehicle side mirror;
   a housing mirror securable to the upper annular lip to form a first interior volume of the housing;
   a spray nozzle attachable to the housing, wherein the spray nozzle is configured to spray the mirror;
   a wiper blade securable to the housing, wherein the wiper blade is configured to wipe the housing mirror;

wherein the housing further comprises a lower annular lip that extends therefrom opposite the upper annular lip to form a second interior volume of the housing, wherein a pair of clips extend from an inner surface of the lower annular lip; and wherein the second interior volume is configured to accept a vehicle side mirror therein such that the pair of clips secure the vehicle side mirror within the second interior volume.

2. The system of claim 1, wherein the spray nozzle is fluidly connected to a cleaning fluid source, wherein the cleaning fluid source comprises a cleaning fluid reservoir of a vehicle to which the vehicle side mirror is attached.

3. The system of claim 2, wherein an operable connection between the spray nozzle and the cleaning fluid source is actuatable by a fluid control of the system.

4. The system of claim 1, further comprising a heating element disposable within the first interior volume of the housing, wherein the heating element is operably connected to a power source.

5. The system of claim 4, wherein an operable connection between the heating element and the power source is actuatable by a heat control of the system.

6. The system of claim 4, wherein the power source comprises a battery of a vehicle to which the vehicle side mirror is attached.

7. The system of claim 1, further comprising a wiper blade motor operably connected to the wiper blade and configured to actuate the wiper blade to wipe the housing mirror, wherein the wiper blade motor is operably connected to a power source.

8. The system of claim 7, wherein an operable connection between the wiper blade motor and the power source is actuatable by a wipe control of the system.

9. The system of claim 7, wherein the power source comprises a battery of a vehicle to which the vehicle side mirror is attached.

10. The system of claim 1, wherein the housing further comprises a first groove thereon, wherein a first connection member of the wiper blade is securable within the first groove such that upon an actuation of the first connection member within the first groove, a blade of the wiper blade wipes the housing mirror.

11. The system of claim 10, wherein the housing further comprises a second groove thereon, wherein a second connection member of the wiper blade is securable within the second groove such that upon the actuation of the second connection member within the second groove, the blade of the wiper blade wipes the housing mirror.

* * * * *